Figure 2:
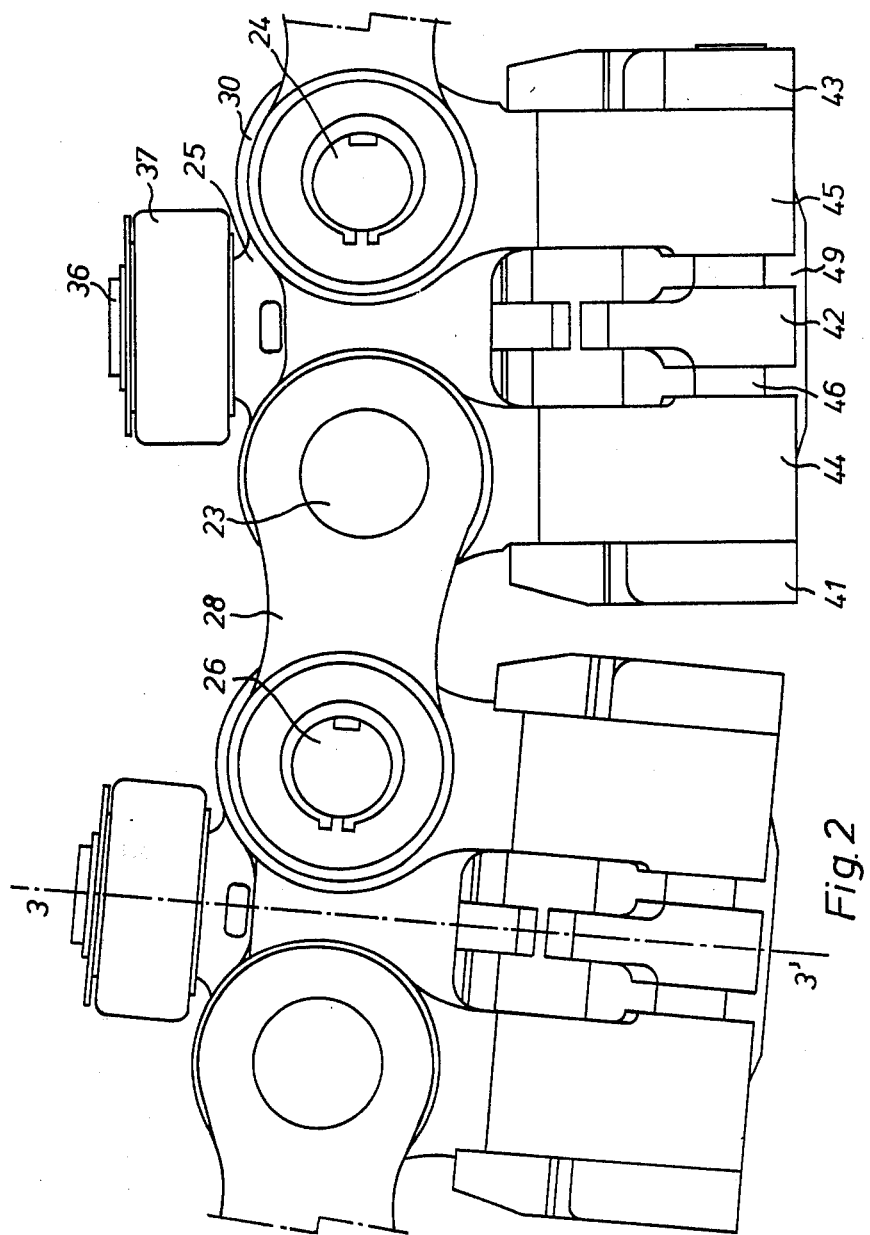

United States Patent [19]
Natens et al.

[11] 3,972,221
[45] Aug. 3, 1976

[54] METHOD AND DEVICE FOR TESTING A CHAIN LINK MECHANISM

[75] Inventors: Luc Yves Natens, Berchem; Jean Martha De Gueldre, Edegem, both of Belgium

[73] Assignee: AGFA-GEVAERT N.V., Mortsel, Belgium

[22] Filed: June 10, 1975

[21] Appl. No.: 585,758

[30] Foreign Application Priority Data
June 11, 1974 United Kingdom............... 25843/74

[52] U.S. Cl..................................... 73/9; 73/136 R
[51] Int. Cl.²......................................... G01N 19/02
[58] Field of Search.................. 73/9, 133 R, 136 R; 340/269; 116/114 Q; 198/39, 40

[56] References Cited
UNITED STATES PATENTS

| | | | |
|---|---|---|---|
| 2,441,993 | 5/1948 | Dasher................................ | 73/9 X |
| 3,130,581 | 4/1964 | Schulman............................ | 73/136 R |
| 3,688,557 | 9/1972 | Marinus............................... | 73/9 |
| 3,893,502 | 7/1975 | Slamar................................. | 73/9 X |

*Primary Examiner*—Charles A. Ruehl
*Attorney, Agent, or Firm*—William J. Daniel

[57] ABSTRACT

A device for testing an endless chain-link mechanism comprises a disc, mounted to a DC-servomotor, which is resiliently urged against the rollers which serve to support the chain-link. The current of the motor is recorded in function of time and the significant part which is a measure of the resistance to rotation is determined. When this value exceeds a predetermined one, the roller is considered to be defective. Auxiliary circuits for signal processing may be provided, if desired.

15 Claims, 7 Drawing Figures

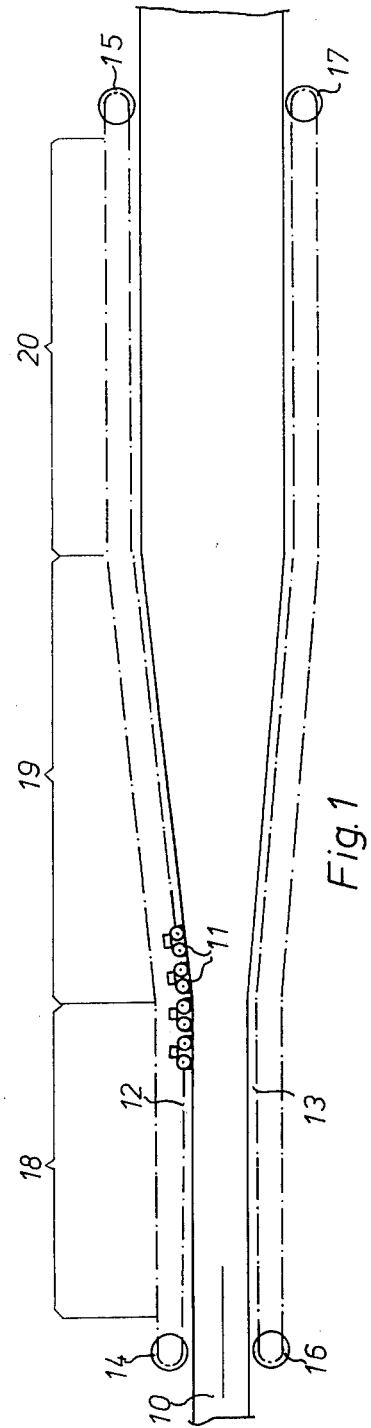
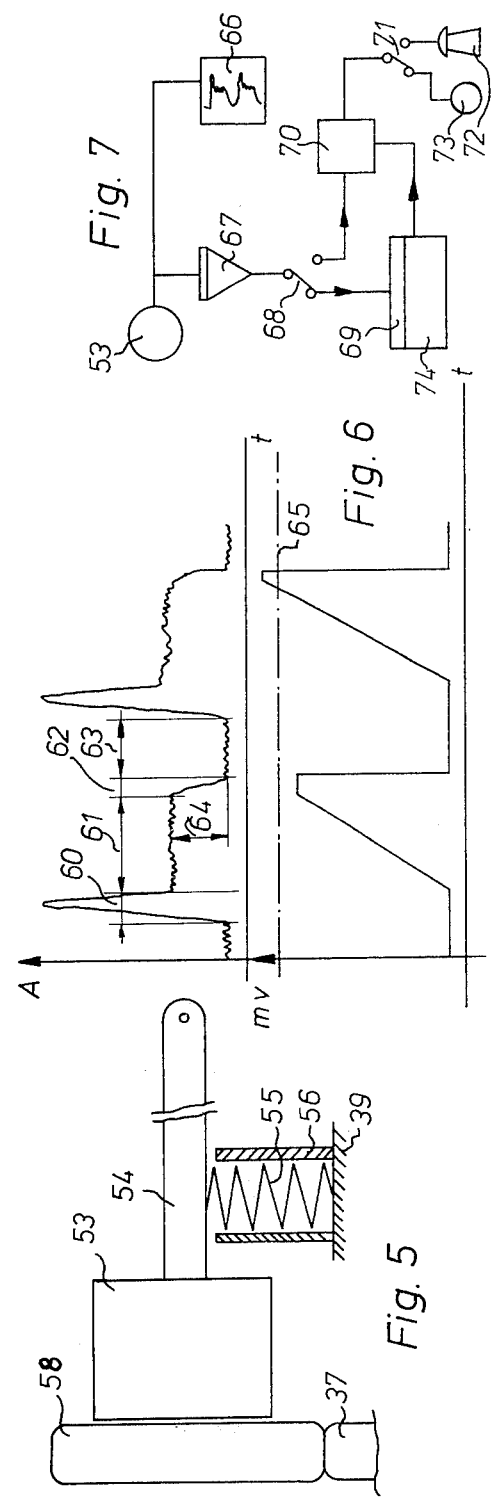

METHOD AND DEVICE FOR TESTING A CHAIN LINK MECHANISM

The present invention is concerned with the testing of rollers of an endless rotating chain link mechanism and in particular with a device for testing defective rollers in such mechanism, wherein the term "defective" is to be used for rollers having an excessive resistance to rotation.

More particularly, the invention is concerned with the testing of rollers forming part of a chain-link mechanism which is used for stretching and heat-setting freshly extruded thermoplastic, orientable polymeric film.

The transverse stretching and heat-setting of a polymeric film exerts high forces upon the chain link mechanism and therefore, the latter is provided with a plurality of rollers which roll upon the guide rail causing rolling friction to occur between the moving chain mechanism and the stationary guide. As the mechanical and thermal load on the bearings of the rollers are both severely high, the said bearings are subjected to frequent maintenance procedures. Due to the great number of the rollers, the lubrication routine is extremely time-consuming and will often be neglected in practice.

Bad lubrication, together with an incorrect mounting of the rollers may result in the fact that a roller runs hot and may get jammed. In the latter case, the rolling friction is converted into a sliding one, so that a roller may start to abrade the guide surface of the rail. The iron particles which are produced by this action may penetrate into the bearings of other rollers so that a cumulative effect of jamming may be produced, destroying the complete mechanism, or they may be projected onto the polymeric film which is being treated.

When said polymeric film is intended to serve as a support for radiographic film, the presence of said iron particles may be the cause of the creation of black spots or black areas on the surface of the latter after processing.

There already exist systems intended for detection of defective rollers.

One of them makes use of an infrared apparatus enabling the maintenance personal to follow up the evolution of the temperature of the rollers and to detect abnormal increase of said temperature. Unfortunately, the sensitivity of the system is rather low, so that an over-heated bearing has already occasioned great damage and the abraded iron particles have spread widely.

Another device for detecting the presence of defective rollers in an endless chain link mechanism is disclosed in our British Pat. Spec. No. 1,328,503. Said device comprises a detecting member which is arranged for limited displacement in the direction of advance of said rollers when they run in contact with it and which is biased against such displacement. The displacement of the detecting member in the direction of roller advance under the influence of frictional contact by the rollers is taken as a measure for the resistance to rotation of said rollers.

An inconvenience of this apparatus is caused by the discrepancy between the mechanical load to which the rollers are subjected and the magnitude of the force which is necessary for causing the free rotation of said roller. It has to be envisaged that extremely high demands are made on the bearings and therefore, only bearings which have excellent rolling properties are used in a chain link mechanism used in the art. This corresponds with the fact that the force necessary for causing free rotation of a roller has the magnitude of some tens of grams, and rollers for which said force has to be greater will at least be classified with the suspected ones. On the other hand, the load to which said rollers are constantly subjected may amount to some tens of kilograms. The apparatus as disclosed in the aforementioned British Patent is based upon such principle, so that its reliability is very questionable, due to the exaggerated ratio existing between both forces, so that it becomes extremely difficult to make a distinction between occasional load variations and inherent resistance to rotation of a roller.

The invention provides a device by means of which the inconvenience mentioned hereinbefore may be greatly reduced or annihilated.

According to the invention, the testing of an endless rotating chain link mechanism which has an endless series of rollers co-operating with a stationary guide, in order to detect whether a defective roller or defective rollers is or are present is characterized in that during the rotation of the chain link mechanism each of said rollers becomes engaged at a certain region along the endless path followed by said rollers, by a driven rotating member which brings such roller (the latter being out of contact with said guide) to a predetermined speed of rotation; and the energy consumed in causing said rotating member to keep the roller rotating at that speed for a predetermined time is used as a measure of the resistance to rotation of that roller.

The invention also includes a device capable of carrying out the testing as described above. A device for testing an endless rotating chain link mechanism having an endless series of rollers cooperating with a stationary guide, in order to detect whether a defective roller or defective rollers is or are present, comprises a rotatable member which is mounted adjacent the endless path of said rollers, at a position such as to engage the rollers while they are out of contact with said guide so that the rollers are free to be driven by said rotatable member, means for driving said rotatable member thereby to bring each roller, during its engagement by said rotatable member, to a predetermined rotational speed, and means for measuring the energy consumed in causing said rotatable member to keep each of said rollers rotating at that predetermined rotational speed for a predetermined period of time.

A device according to the invention may be completed with means which responds to exaggerated values of an output signal in order to activate an identification unit, permitting the location of a defective roller to be identified.

Figure 4:
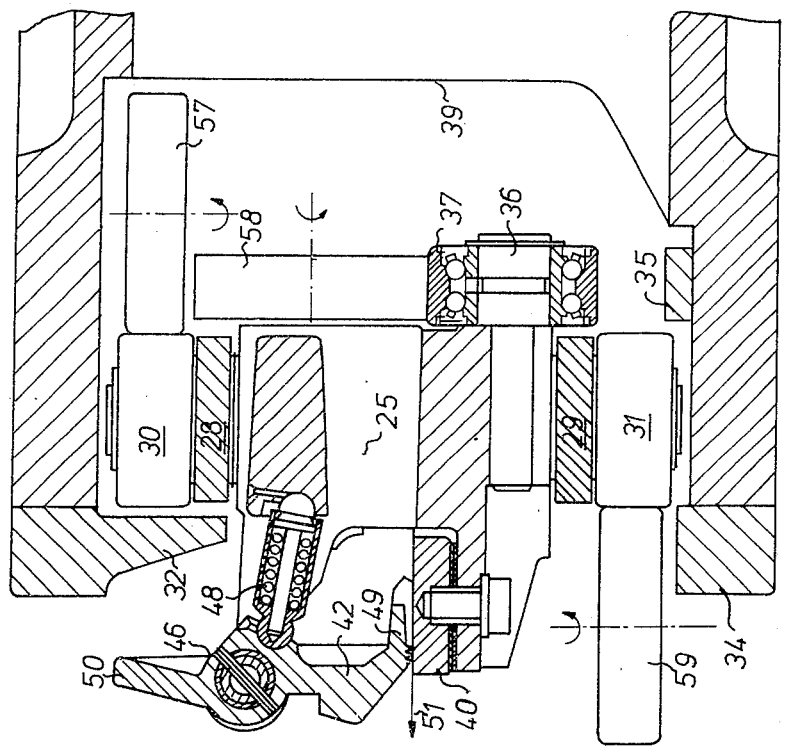
Figure 3:
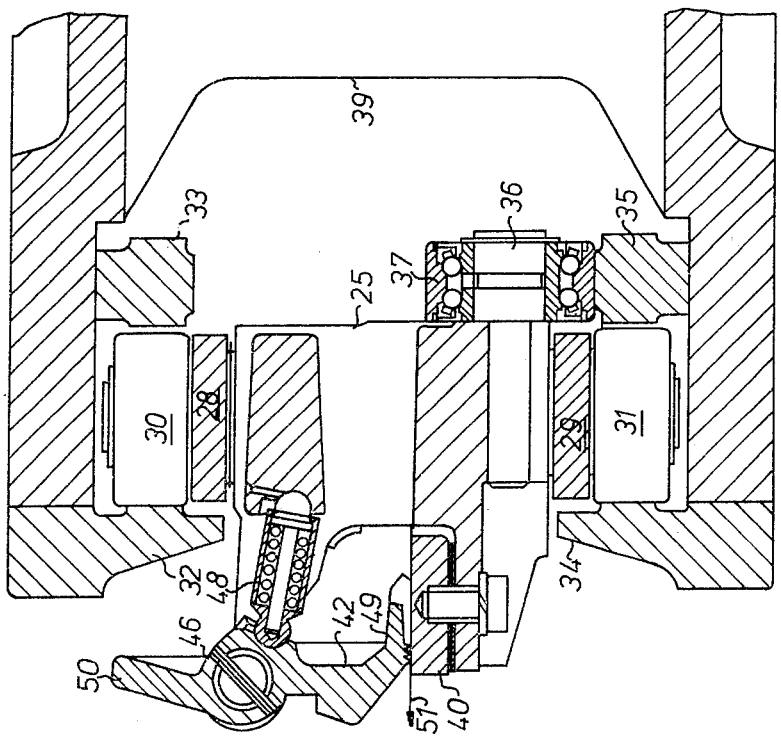

An embodiment of the invention is described hereinafter with reference to the accompanying figures in which:

FIG. 1 is a top view of a film web which is being transversally stretched and heat-set, FIG. 2 is a top view of two film clamps, FIG. 3 is a transverse cross sectional view of a film clamp on the section line 3—3 of FIG. 2, FIG. 4 is a transverse cross sectional view of a film clamp on the section line 3—3 of FIG. 2 incorporating the principles of a device according to the invention, FIG. 5 shows the rotatable member in contact with a bearing, FIG. 6 illustrates the evolution of the current of the motor driving the rotatable member according to FIG. 5 during two detection cycles and FIG. 7 gives a schematic diagram of an installation permitting the measurement of excessive bearing friction and the alarm circuits.

As may be seen in FIG. 1, a freshly extruded web 10 of a linear, organic orientable polymer material, for example polyethylene terephthalate is presented. The said web has been previously quenched on a quenching drum and subsequently stretched longitudinally. As both stages do not imply the use of an apparatus according to the invention, they have not been represented. The invention as such is or may be applied in the production stages following the afore-mentioned ones. These production stages comprise the transverse stretching which occurs in zone 19 and the heat-setting which is carried out in zone 20. Prior to the transverse stretching the web 10 is pre-heated in the zone 18. In order to guarantee reproducible processes the web 10 is gripped at its edges by a plurality of film clamps 11, from which only a few are shown for clarity's sake. The film clamps 11 are supported by endless chain-link mechanisms 12 and 13, which extend between sprocket wheels 14, 15 and 16, 17. Wheels 15 and 17 are driven causing the advance of the chain-link mechanism. The chain-links are guided by stationary rails so that the film clamps are forced to follow parallel paths in the zone 18, diverging paths in the zone 19 and again parallel paths in zone 20. At the end of zone 20, the clamps 11 are re-opened and the web 10 is released and can pass to other production stages such as edge-trimming, heat-relaxing, subbing, etc.

During the transverse stretching and heat-setting of the web 10, the latter exerts great forces on the film clamps. In view thereof, the chain-link mechanism supporting the clamps is provided with a plurality of rollers which cooperate with stationaryguides so that a minimum of friction is stationary guides The chain-links and the film clamps, which form one unit, are shown in detail in FIGS. 2 and 3. In FIG. 2 a top view of two chain-sections is given wherein the guide rails are omitted and the upper roller at the left side of each section has been removed. In FIG. 3 a transverse cross-sectional view of one section is given which shows the cooperation of the chain mechanism with the guide rails.

Each chain element comprises a body portion 25 with two parallel bores in which pins 23 and 24 rotatably fit. The body portion 25 is linked to the next element through link plates 28 and 29 which closely fit over the pin 23 of the first section. Rollers 30 and 31 are fitted to the extremities of each pin and they cooperate with guide rails 32, 33 and 34, 35 which have parallel guide surfaces which determine the path of the film clamps in the horizontal plane. The body portion of each element is also provided with a roller 37 which is rotatably supported by a stud 36 and which cooperates with a guide face on top of the guide rails 35 so as to guide the chain mechanism in the vertical plane.

The guide rails are bolted to a framework 39 and they terminate close to the sprocket wheels 14 to 17, respectively. Each sprocket wheel has two rows of teeth which engage the chains between the rollers 30 and 31 and which fit against the outer sides of the link plates so as to vertically support the chains when they are returned over 180 degrees.

Each film clamp comprises a lower fixed jaw 40 which is mounted on a horizontal protruding part of the body portion and an upper movable jaw 49 which is supported by three arms 41, 42 and 43 which are fitted to a horizontal pin 46. The said pin is pivotally journalled in extended portions 44 and 45 of the body member. The jaw is opened through an arm 50 which forms an elongated part of the central arm 42 and which is pivoted through engagement with an additional guide, not shown, which pushes said arm to the left, thereby displacing the jaw 49 to the "open" position, by pivoting the jaw 49 counter-clockwise about the axis of the pin 46 in the position of FIG. 3 in order to release the film after its stretching.

A compression spring mechanism 48 keeps the pivotal jaw 49 in its said open position during the return movement of the chain from the sprocket wheels 15, 17 to the sprocket wheels 14, 16. A further guide (not shown) is provided which cooperates with the arm 50 to cause the jaw 49 to move back into closed position.

The rollers used in the mechanism described actually comprise a double row of radial ball bearings, the inner ring of which is fitted to the chain-link mechanism and the outer ring of which makes contact with the guide surface of the rail.

During operation of the mechanism, the travelling web which is gripped with its edge between the jaws 40 and 49 exerts a pulling force indicated by the arrow 51. The reaction forces arise at the contact areas between the rollers 30, 31 and the guide surface of the respective guide rails 32 and 34, and they cause said rollers to roll on the guide rails. The roller 37 rolls on the guide surface of rail 35, since it is biased towards said rail by the force of gravity which acts on the chain mass. During the return movement of the chain mechanism, the force acting in the direction of arrow 51 becomes zero, so that owing to the greater mass of the chain sections at the side of the jaws, the rollers 31 will now tend to ride on the guide rail 35.

The rollers continue rolling on their respective guide surfaces as long as the running torque of the bearings is lower than the driving torque which is supplied by the frictional contact with the guide surfaces.

In case, however, the bearing friction increases, for example as a consequence of lubricant failure or as a consequence of the presence of foreign matter in the ball-groove contact area, the driving of the roller may become insufficient to keep the roller rotating. The outer bearing rings start to slip on the surface of the guide rail, resulting in an abrasion of the guide rail surface. The tiny metal particles which are produced as a consequence thereof are distributed over the rail and they will penetrate into other roller bearings which may become jammed in their turn.

FIG. 4 is a view like FIG. 3 of a mechanism which is similar to that shown in FIGS. 2 and 3 but which incorporates a testing device according to the invention. The same reference numerals are used in the different figures to denote corresponding parts. In the mechanism according to FIG. 4 the guide rails 32, 34 and 33, 35 are interrupted and the framework 39 is formed to accommodate wheels or discs 57, 58 and 59 at the regions of those interruptions. The said discs are urged against the respective bearings 30, 37 and 31. It is clear that the discs 57, 58 and 59 will not necessarily be positioned at the same position along the course of the endless chain link mechanism because their dimensions may be too large to be located in a restricted space.

The principle of the device according to the invention is as follows: the necessary torque in order to bring and keep a roller in rotation at a given speed is a measure of the internal or inherent resistance to rotation of said roller. When now bringing the discs 57, 58 and 59 to a peripheral speed which corresponds to that of the rollers they respectively contact, the energy consumed by the motors which cause the discs to rotate will be a measure of the internal friction in roller bearings. More particularly, it may be stated that the energy difference between a period during which the discs runs out of contact with rollers and a period during which they are in contact with rollers is a measure of the resistance to rolling motion of the bearings of those rollers. In case an electric motor is used for bringing a disc into rotation, the recording of the current at constant potential and constant motor speed may be used for this purpose. It will be appreciated that instead of electric motors, also their hydraulic or pneumatic analogues may be used. The motors and the discs mounted on their shafts are submitted to a number of criteria of mechanical nature.

As to the motors, they should have an elevated starting torque because the energy lost by the disc at the moment of contact with the bearing must be restored as soon as possible. The foregoing statement is a consequence of the facts that the real measuring time is relatively small because of the small distance between two bearings themselves. Moreover, a part of the energy, contained in the rotating disc, which acts as a kind of flywheel, is lost in overcoming inertia. In view of the foregoing and the small measuring time, a motor having a high starting torque is necessary. The loss of energy of the discs may be limited by using a disc, which has a moment of inertia which is large in comparison with that of the rollers. The higher the ratio between the moment of inertia of the disc, and that of the roller, the lower will be the loss of peripheral speed of the disc at the moment of contact. So the aforementioned ratio will preferably be 10 to 1 or more. The only theoretical limitation will appear to be a mechanical time constant, in order to be sure that the transient current is sufficiently extinguished within the restricted measuring period.

It is advantageous that from the moment of contact each roller is brought as soon as possible to the same peripheral speed as the wheel or disc. This result can be promoted by providing a layer having a high coefficient of friction on the surface of the disc which contacts the roller. Preferably rubber is used for this purpose. The ratio between the diameter of the disc and that of the roller is preferably at least 5:1.

FIG. 5 shows a set-up of the disc 58 contacting the roller 37. The motor 53 is a DC-servomotor of the "direct-drive"-type which may be mounted as a sole unit with the disc 58. This type of motor is also capable of delivering high peak-energies during short periods. The motor and the associated wheel or disc are mounted on a bar 54 which is pivotally mounted. A spring 55, housed in a tube 56, connected to the framework 39 of the machine, resiliently biases the disc 58 against the bearing. This is done in order to prevent occasional oscillations of the bar 54 which would be generated when due to small irregularities the contact between the roller 37 and the disc 58 would become too abruptly. The disc 58 preferably stays in contact with the roller 37 at least as long as to drive the roller through one complete revolution.

In FIG. 6, typical registration curves of the current consumed by the motor are represented in function of time. The curves may be divided into four main parts: the first part, denoted 60, corresponds with the period that the energy lost by the disc must be recovered; the part 61 corresponds with the period that both bodies have the same peripheral speed and during which the roller is driven by the motor. This value is a measure for the resistance to rotation of the roller in question. During the period 62, the curve slopes downwards in order to reach the level corresponding with the period 63 which indicates the current consumed by the motor when there is no contact between the roller and the disc.

The current difference indicated by 64 is the net portion of the current which is caused by the internal friction of the roller. When this level exceeds a predetermined value, an alarm circuit may be energized in order to stop the extrusion line or to replace the concerned bearing.

The signal 61, 62 may, if necessary, be integrated and a maximal acceptance level 65 may be established, so that when the integrated signal reaches that level, the same measures as mentioned hereinbefore may be taken.

As stopping an extrusion line for replacement of a defective roller is an expensive operation, due to loss of production, it may be advantageous to follow the evolution of a roller which is suspected to be defective.

A circuit capable of performing such operation is represented in FIG. 7. The current, consumed by the motor 53 is continuously monitored upon a recorder 66. The signal however is also fed to an integrating circuit 67 and may then be fed to a threshold detector 70. With a double-pole switch 68 the signal may be applied to a memory device by means of which the passage of a roller is recorded each time and which also stores the signal corresponding with each roller. It is clear that in this case, at least one roller in each chain has to be provided with a marker in order to deliver an unequivocal zero signal to the memory which may recognize the following bearings by counting the others which pass, for example, in front of a photoelectric cell. After an arbitrary number of measurements have been made, a calculating device 74 may calculate the average value of the signals corresponding with each roller and feed this signal to the threshold detector 70. The output signal of the latter may serve either to energize a buzzer 72 or a spraying device 73 in order to mark the defective roller by means of a nozzle connected to a marker dye supply conduit. It will be understood that the chain installation shown in FIGS. 1 to 4 will actually comprise six detection devices as described in connection with FIG. 7, because each of the two chain mechanisms comprises three rows of rollers. The output of the six detection devices may be connected to a commutator which connects one single measuring circuit to the motors of the six discs. In this way the bearing friction of the six rows of rollers of the installation is plotted out on one recording chart. The commutation may occur automatically after each complete chain revolution, or after several chain revolutions.

It may be concluded that the apparatus according to the invention does not show the inconveniences of prior art devices. The reduction or avoidance of measuring errors, is easily accomplished with the help of the new system, owing to the automatic compensation of said errors by means of rotational systems the place of contact of which is always situated on the straight line which joins the centers of both circular bodies.

In addition, the application of the invention is not limited to the testing of rollers of chain mechanisms used in the treatment of polymeric films, but it extends also to the testing of other endless chain mechanisms, for example, chains used for supporting metal parts such as car bodies, for transporting them in a continuous movement through a cleaning station, an etching station, a printing station, a drying station, etc. in succession.

We claim:

1. A method of testing an endless rotating chain-link mechanism which has an endless series of rollers moving in an endless path defined by a stationary guide, in order to detect whether a defective roller is present, wherein during the rotation of the chain-link mechanism each of said rollers is engaged at a certain region along said endless path by a driven rotating member which brings such roller while out of contact with said guide to a predetermined speed of rotation; and the energy consumed in causing said rotary member to keep the roller rotating at that speed for a predetermined time is used as a measure of the resistance to rotation of that roller.

2. A method according to claim 1, in which said energy is measured over a period of time corresponding to at least one complete revolution of said roller.

3. A method according to claim 1, in which said rotatable member is resiliently biased against the rollers.

4. A method according to claim 1, in which said consumed energy is automatically monitored and a recording or warning signal is automatically produced when the amount of said energy which is consumed during a predetermined period of time, is in excess of a predetermined value.

5. A method according to claim 4, in which a record is produced of said signal which enables the position along the series of rollers at which a defective roller is located to be identified.

6. A method according to claim 1 comprising the additional steps of performing for each roller a plurality of measurements of the amount of energy consumed each time said roller passes the driven rotating member placed adjacent the endless rotating chain-link mechanism, and calculating the average value of the amount of energy consumed during said plurality of measurements.

7. A device for testing an endless rotating chain-link mechanism having an endless series of rollers moving in an endless path defined by a stationary guide in order to detect whether a defective roller is present, such device comprising a rotatable member which is mounted adjacent to the endless path of said rollers, at a position such as to engage the rollers while they are out of contact with said guide and thus free to be driven by said rotatable member, means for driving said rotatable member thereby to bring each roller, during its engagement by said rotatable member, to a predetermined rational speed, and means for measuring the energy consumed in causing said rotatable member to keep each of said rollers rotating at that predetermined rotational speed for a predetermined period of time.

8. A device according to claim 7 in which means is provided which functions in dependence on said consumed energy to produce records or warning signals when such energy exceeds a predetermined value.

9. A device according to claim 7 including means which resiliently biases said rotating member against the rollers.

10. A device according to claim 7 in which said rotatable member is in the form of a wheel which is driven by an electric motor fed with current at a fixed predetermined voltage, and wherein said measuring means operates to measure electric current consumption by said motor.

11. A device according to claim 10, in which said wheel rotates at such rotational speed and contacts the rollers to be tested during such a period of time that during each contact with a roller said wheel rotates that roller through at least one complete revolution.

12. A device according to claim 11, in which the surface of said wheel which contacts the rollers is provided with a material having a high coefficient of friction.

13. A device according to claim 10, in which the ratio between the radius of said wheel and the radius of said rollers to be inspected is at least 5 to 1.

14. A device according to claim 10, in which the ratio between the moment of inertia of said wheel and the moment of inertia of the roller to be inspected equals at least 10 to 1.

15. A device according to claim 10, wherein means is provided which functions in response to values of the energy which is consumed exceeding a predetermined value so as to produce a record which permits identification of the approximate position along the series of rollers in which a defective roller responsible for excessive energy consumption is located.

* * * * *